(12) United States Patent
Sugawara

(10) Patent No.: US 9,899,872 B2
(45) Date of Patent: Feb. 20, 2018

(54) POWER TRANSMISSION DEVICE, POWER TRANSMISSION METHOD, AND STORAGE MEDIUM

(71) Applicant: CANON KABUSHIKI KAISHA, Tokyo (JP)

(72) Inventor: Kazuhiro Sugawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 898 days.

(21) Appl. No.: 14/276,657

(22) Filed: May 13, 2014

(65) Prior Publication Data

US 2014/0339909 A1    Nov. 20, 2014

(30) Foreign Application Priority Data

May 14, 2013    (JP) ................. 2013-102441

(51) Int. Cl.
*H02J 50/00*        (2016.01)
*H02J 17/00*        (2006.01)
*H02J 7/02*         (2016.01)
*H02J 7/00*         (2006.01)

(52) U.S. Cl.
CPC .............. *H02J 17/00* (2013.01); *H02J 7/025* (2013.01); *H02J 2007/0096* (2013.01)

(58) Field of Classification Search
None
See application file for complete search history.

(56) References Cited

U.S. PATENT DOCUMENTS

2012/0280575 A1* 11/2012 Kim ................ H02J 17/00
                                               307/104
2014/0300200 A1* 10/2014 Ito ................. H02J 17/00
                                               307/104
2015/0340881 A1* 11/2015 Nakano .............. H02J 5/005
                                               307/104

FOREIGN PATENT DOCUMENTS

JP        2009-136132 A      6/2009

* cited by examiner

*Primary Examiner* — Lincoln Donovan
*Assistant Examiner* — Khareem E Almo
(74) *Attorney, Agent, or Firm* — Canon U.S.A., Inc. IP Division

(57) ABSTRACT

A power transmission device for wirelessly transmitting power to a power reception device includes a power transmission target determination unit configured to determine a power transmission target power reception device, a power transmission time determination unit configured to determine, if a power reception device to which power has already been transmitted is determined as the power transmission target power reception device, a time that is longer than a previously required power transmission time for transmitting power to the power transmission target power reception device as power transmission time therefor, and a power transmission unit configured to transmit power to the power transmission target power reception device for the power transmission time determined by the power transmission time determination unit.

5 Claims, 15 Drawing Sheets

FIG.7

MANAGEMENT TABLE 62

| INDEX | DEVICE ID | POWER INFORMATION | RESONANCE FREQUENCY | MINIMUM TIME | MAXIMUM TIME | POWER TRANSMISSION TIME |
|---|---|---|---|---|---|---|
| 0 | DeviceA | CHARGING RATE (%), BATTERY CAPACITY (1000 mAh), CURRENT AND VOLTAGE DURING POWER RECEPTION | 10 MHz | 1 SEC | 10 SEC | 2 SEC |
| 1 | DeviceB | CHARGING RATE (%), BATTERY CAPACITY (2000 mAh), CURRENT AND VOLTAGE DURING POWER RECEPTION | 11 MHz | 1 SEC | 20 SEC | 2 SEC |
| 2 | DeviceC | CHARGING RATE (%), BATTERY CAPACITY (2000 mAh), CURRENT AND VOLTAGE DURING POWER RECEPTION | 12 MHz | 1 SEC | 20 SEC | 2 SEC |
| 3 | DeviceD | CHARGING RATE (%), BATTERY CAPACITY (1000 mAh), CURRENT AND VOLTAGE DURING POWER RECEPTION | 20 MHz | 1 SEC | 10 SEC | 2 SEC |

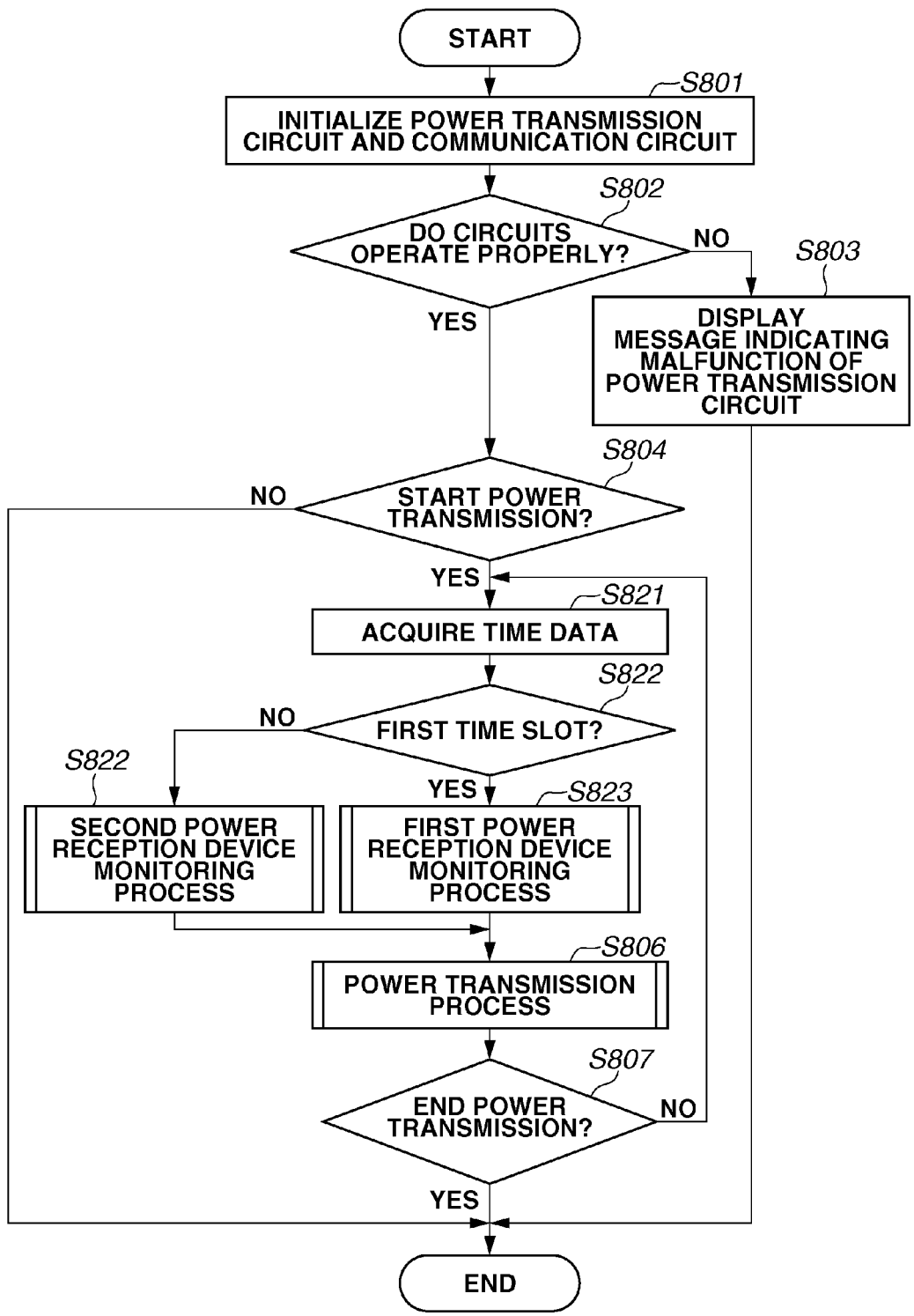

POWER TRANSMISSION DEVICE, POWER TRANSMISSION METHOD, AND STORAGE MEDIUM

BACKGROUND

Field

Aspects of the present invention generally relate to a power transmission device, a power transmission method, and a storage medium.

Description of the Related Art

Conventionally, techniques for feeding power in a non-contact manner (wirelessly) have been known. The following four methods are used for feeding power in a non-contact manner: an electromagnetic induction method, a magnetic resonance method, an electric field coupling method, and a radio wave reception method. Among these four methods, the magnetic resonance method is characterized in that sufficient power can be transmitted and a long power transmission distance can be ensured. Thus, the magnetic resonance method is particularly drawing attention among the four methods. For example, as such magnetic resonance method, by utilizing this power transmission distance, Japanese Patent Application Laid-Open No. 2009-136132 discusses a 1-to-N power feeding method for allowing a power transmission device to transmit power to a plurality of reception devices wirelessly.

According to the technique discussed in Japanese Patent Application Laid-Open No. 2009-136132, in a standby mode in which the power transmission device is not transmitting power, the power transmission device transmits certain pulse signals to determine whether any power reception device has come close within a few meters of the power transmission device. If a reception device transmits its own unique identification data (ID) to the power transmission device, the power transmission device determines whether the source that has transmitted the unique ID is a power reception device as a power feeding target. If the wireless power reception device is determined to be a target, the power transmission device feeds power to the power reception device. The power transmission device can feed power to a plurality of power reception devices while switching the power feeding targets in a time-division manner.

Regarding wireless power transmission techniques, improvement in transmission efficiency is demanded. Efficiency of power transmission from a power transmission device to a power reception device depends on the length of power transmission time by the power transmission device. More specifically, longer power transmission time results in higher transmission efficiency. However, in a time-division power feeding method, if the power transmission time for one power reception device is extended, the power transmission start time for the next power reception device is delayed, which is a problem.

SUMMARY

An aspect of the present invention is generally directed to a technique capable of improving transmission efficiency while starting power transmission to power reception devices at appropriate timing.

According to an aspect of the present invention, a power transmission device wirelessly transmitting power to a power reception device, includes a power transmission target determination unit configured to determine a power transmission target power reception device, a power transmission time determination unit configured to determine, if a power reception device to which power has already been transmitted is determined as the power transmission target power reception device, a time that is longer than a previously required power transmission time for transmitting power to the power transmission target power reception device as power transmission time therefor, and a power transmission unit configured to transmit power to the power transmission target power reception device for the power transmission time determined by the power transmission time determination unit.

Further features of the present disclosure will become apparent from the following description of exemplary embodiments with reference to the attached drawings.

BRIEF DESCRIPTION OF THE DRAWINGS

FIG. 7 illustrates a management table.
FIG. 15 is a flowchart illustrating a process performed by a power transmission device.

DESCRIPTION OF THE EMBODIMENTS

Various exemplary embodiments will be described in detail below with reference to the drawings.

Figure 1:
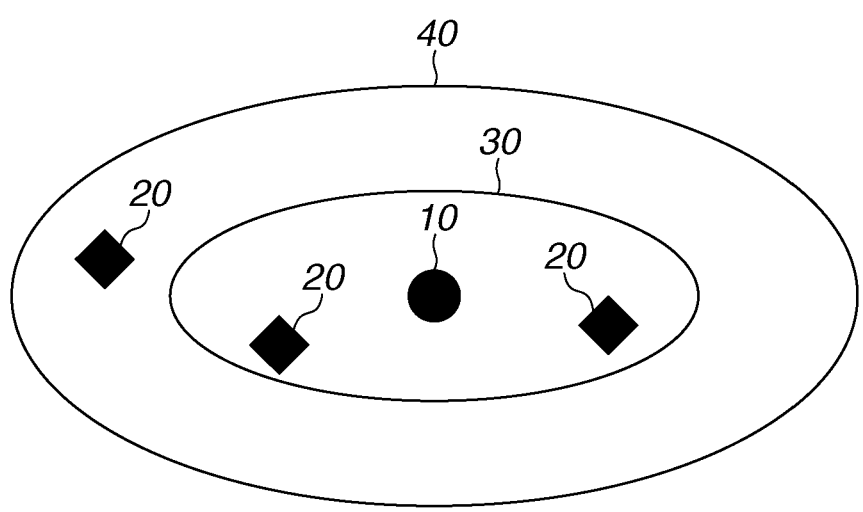
FIG. 1 illustrates a wireless power feeding system.

FIG. 1 illustrates a wireless power feeding system. The wireless power feeding system includes a power transmission device 10 as a power feeding device and a plurality of power reception devices 20. The power transmission device 10 can wirelessly feed power to the power reception devices 20 in a non-contact manner. In addition, the power transmission device 10 can exchange data necessary for power feeding with the power reception devices 20. The power reception devices 20 can wirelessly receive power from the power transmission device 10. In addition, the power reception devices 20 can exchange data necessary for power feeding with the power transmission device 10.

The power transmission device 10 can feed power to the power reception devices 20 located within a power feeding area 30 illustrated in FIG. 1. The power feeding area 30 is determined by the power transmission capability of the power transmission device 10. The power transmission device 10 and the power reception devices 20 can perform data communication within the communication area 40.

A relationship between the power feeding area 30 and the communication area 40 will be described. The power feeding area 30 is smaller than the communication area 40. More specifically, the power feeding area 30 is included in the communication area 40. If a plurality of power reception devices 20 exists in the power feeding area 30 as illustrated in FIG. 1, the power transmission device 10 can wirelessly feed power to the plurality of power reception devices 20.

Figure 2:
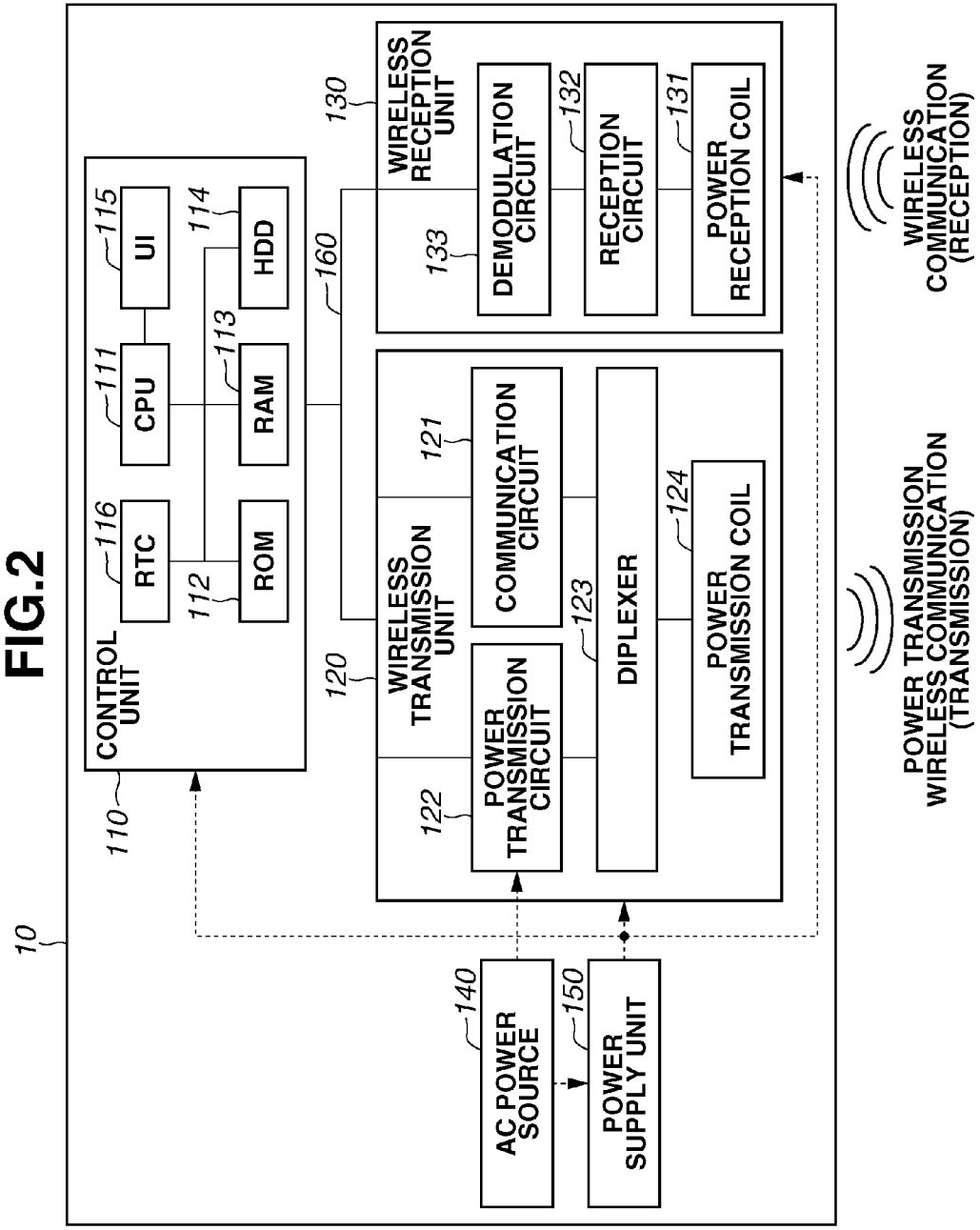
FIG. 2 illustrates a power transmission device.

FIG. 2 illustrates the power transmission device 10. In FIG. 2, solid lines represent data exchange lines and dotted lines represent power supply lines. The power transmission device 10 includes a control unit 110, a wireless transmission unit 120, a wireless reception unit 130, an alternating-current (AC) power source 140, and a power supply unit 150.

The control unit 110 controls the power transmission device 10. The control unit 110 includes a central processing unit (CPU) 111, a read-only memory (ROM) 112, a random access memory (RAM) 113, a hard disk drive (HDD) 114, a user interface (UI) 115, and a real-time clock (RTC) 116. The control unit 110 is connected to the wireless transmission unit 120 and the wireless reception unit 130 via an internal bus 160.

The CPU 111 processes various data to control the power transmission device 10. The ROM 112 is a nonvolatile storage medium and stores a boot program and the like used by the CPU 111. Other than the boot program, the ROM 112 stores nonvolatile data. As such nonvolatile data, the ROM 112 stores information about power transmission control settings, resonance frequencies set in the power reception coil 131, time required for transmitting power to the power reception devices 20, maximum and minimum values (maximum and minimum time) required for transmitting power, and time slots set for a power transmission process.

The RAM 113 is a volatile storage medium to temporarily store data, programs, and the like used by the CPU 111. The HDD 114 is a nonvolatile storage medium to store an operating system (OS), applications, and the like used by the CPU 111.

The UI 115 is an operation input unit for receiving input operations from a user such as key operations and touch panel operations. The UI 115 is a display unit for displaying various types of information. The UI 115 includes a liquid crystal display unit and a touch panel, for example. The CPU 111 detects a press on the touch panel. The UI 115 may further include a light-emitting diode (LED) or a speaker. In such cases, the power transmission device 10 can notify the user of information by illuminating the LED or by outputting sound. The RTC 116 measures time.

The wireless transmission unit 120 wirelessly transmits power to the power reception devices 20. The wireless transmission unit 120 includes a communication circuit 121, a power transmission circuit 122, a diplexer 123, and a power transmission coil 124. The communication circuit 121 generates a modulated signal for performing communication. The power transmission circuit 122 generates a modulated signal for transmitting power.

The diplexer 123 synthesizes the modulated signals generated by the communication circuit 121 and the power transmission circuit 122. The power transmission coil 124 transmits the modulated signal synthesized by the diplexer 123 to a power reception device 20.

The wireless reception unit 130 receives data from power reception devices 20. The wireless reception unit 130 includes a power reception coil 131, a reception circuit 132, and a demodulation circuit 133. The power reception coil 131 receives a modulated signal for performing communication from a power reception device 20. The reception circuit 132 receives the modulated signal received by the power reception coil 131. The demodulation circuit 133 demodulates the modulated signal received by the power reception coil 131.

The AC power source 140 feeds an AC voltage to the power transmission coil 124 and the power supply unit 150. The power supply unit 150 converts the AC voltage fed from the AC power source 140 into a direct-current (DC) voltage and feeds the DC voltage to the control unit 110, the wireless transmission unit 120, and the wireless reception unit 130.

In the power transmission device 10 according to the present exemplary embodiment, the communication circuit 121 and the power transmission circuit 122 are arranged as a same circuit. Alternatively, the power transmission device 10 may include a communication circuit and an antenna circuit as a same circuit and a power transmission circuit and a power transmission coil as a same circuit.

The following functions and processes of the power transmission device 10 are realized by the CPU 111 reading a program stored in the ROM 112 or the HDD 114 and executing the program.

Figure 3:
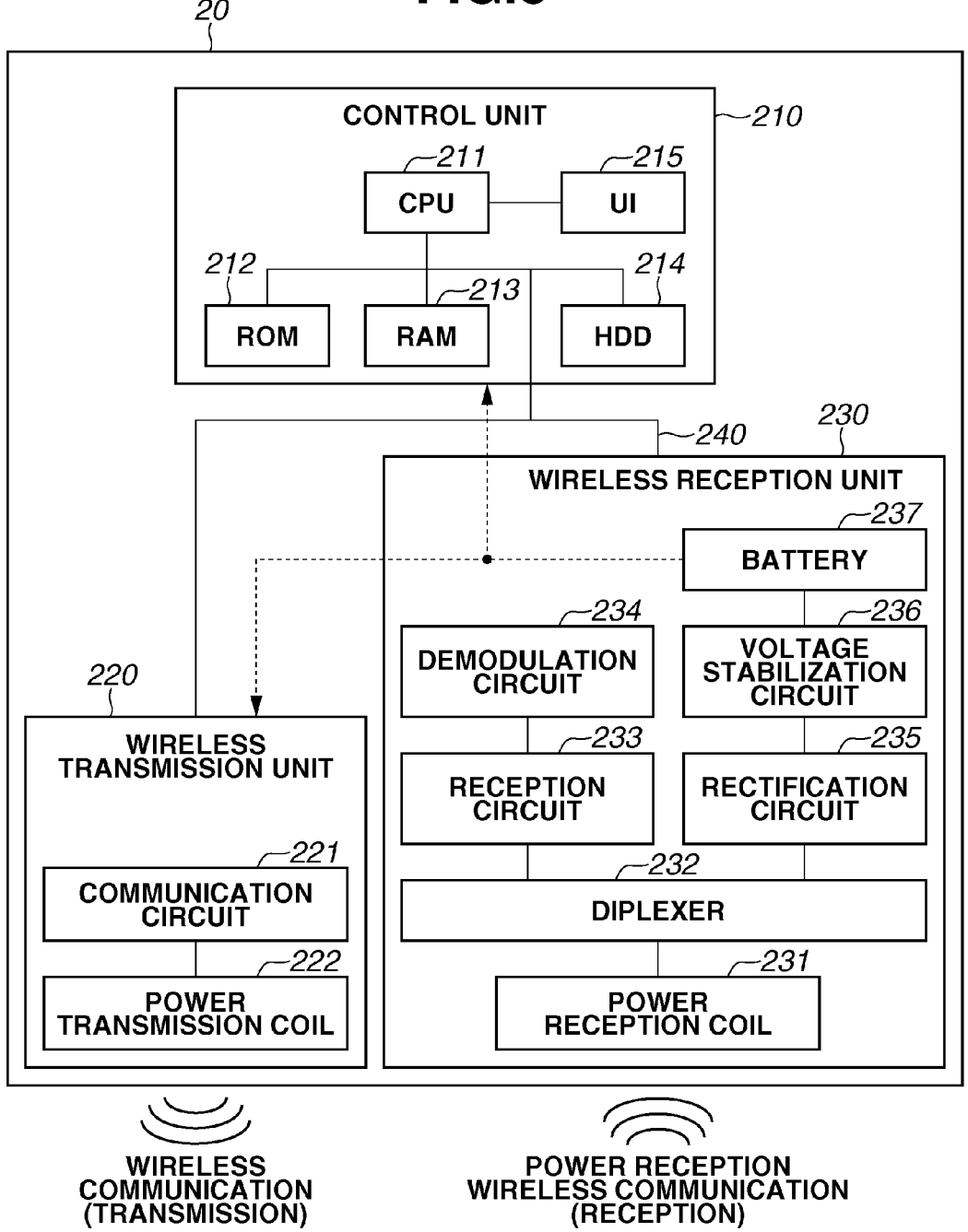
FIG. 3 illustrates a power reception device.

FIG. 3 illustrates a power reception device 20. In FIG. 3, solid lines represent data exchange lines and dotted lines represent power supply lines. The power reception device 20 includes a control unit 210, a wireless transmission unit 220, and a wireless reception unit 230. The control unit 210 controls the power reception device 20 and includes a CPU 211, a ROM 212, a RAM 213, an HDD 214, and a UI 215. The control unit 210 is connected to the wireless transmission unit 220 and the wireless reception unit 230 via an internal bus 240.

The CPU 211 processes various data to control the power reception device 20. The ROM 212 is a nonvolatile storage medium to store various types of data such as a boot program used by the CPU 211. The RAM 213 is a volatile storage medium to temporarily store data, programs, and the like used by the CPU 211. The HDD 214 is a nonvolatile storage medium to store an OS, applications, and the like used by the CPU 211. Alternatively, the power reception device 20 may be configured without the HDD 214. In such a case, the ROM 112 stores the OS, applications, and the like. The UI 215 displays various types of information to the user and receives various instructions from the user.

The wireless transmission unit 220 transmits data to the power transmission device 10. The wireless transmission unit 220 includes a communication circuit 221 and a power transmission coil 222. The communication circuit 221 generates a modulated signal for performing communication. The power transmission coil 222 transmits the modulated signal generated by the communication circuit 221 to the power transmission device 10.

The wireless reception unit 230 wirelessly receives power from the power transmission device 10. The wireless reception unit 230 includes a power reception coil 231, a diplexer 232, a reception circuit 233, a demodulation circuit 234, a rectification circuit 235, a voltage stabilization circuit 236, and a battery 237. The power reception coil 231 receives a modulated signal from the power transmission device 10. The diplexer 232 separates the modulated signal received by the power reception coil 231 into a modulated signal for performing communication and a modulated signal for transmitting power. The reception circuit 233 receives the modulated signal for performing communication obtained by the division performed by the diplexer 232.

The demodulation circuit 234 demodulates the modulated signal. The rectification circuit 235 rectifies the modulated signal for transmitting power obtained by the separation performed by the diplexer 232 and generates a DC voltage. The voltage stabilization circuit 236 stabilizes the DC voltage generated by the rectification circuit 235. The battery 237 receives the voltage stabilized by the voltage stabilization circuit 236 and stores power. In addition, based on the stored power, the battery 237 feeds the DC voltage to the control unit 210, the wireless transmission unit 220, and the wireless reception unit 230.

The following functions and processes of the power reception device 20 are realized by the CPU 211 reading a program stored in the ROM 212 or the HDD 214 and executing the program.

Figure 4:
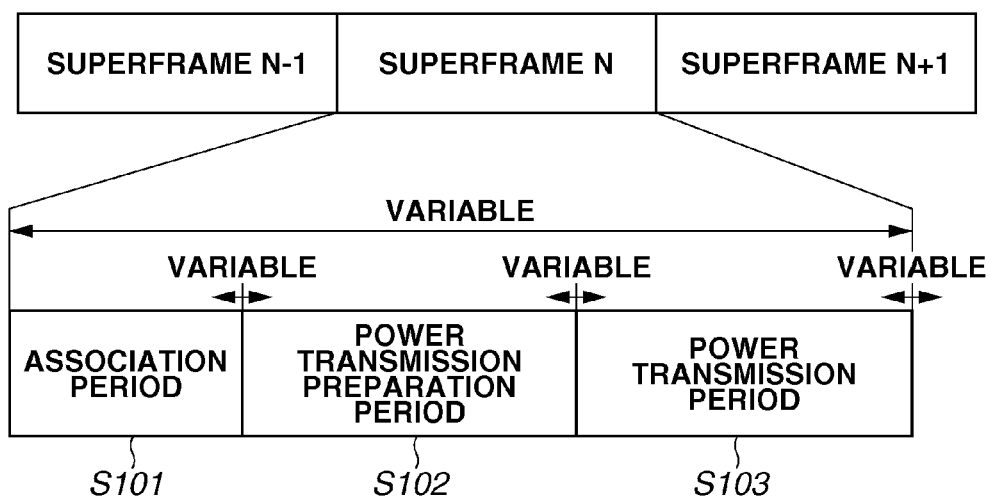
FIG. 4 illustrates an example of superframes.

FIG. 4 illustrates an example of superframes. By repeating the superframe, the wireless power feeding system according to the present exemplary embodiment performs a power transmission process. A single superframe includes step S101 (association period), step S102 (power transmission preparation period), and step S103 (power transmission period). Each of the periods is variable.

In step S101, the power transmission device 10 checks a device ID and necessity for power of a power reception device 20. If the power transmission device 10 is notified by the power reception device 20 of a device ID and necessity for power, the operation proceeds to step S102. When the operation proceeds from step S101 to step S102 is also variable.

Next, in step S102, the power transmission device 10 transmits a data request to the power reception device 20. In addition, the power reception device 20 transmits a response or an acknowledge in response to the data request from the power transmission device 10. The lengths of the response frame and the acknowledge frame are variable. After step S102, the power transmission device 10 causes the operation to proceeds to step S103. The timing at which the operation proceeds from step S102 to step S103 is also variable.

Next, in step S103, the power transmission device 10 transmits power to the power reception device 20. In step S103, even without a request frame from the power transmission device 10, the power reception device 20 can transmit a frame to the power transmission device 10.

Figure 5:
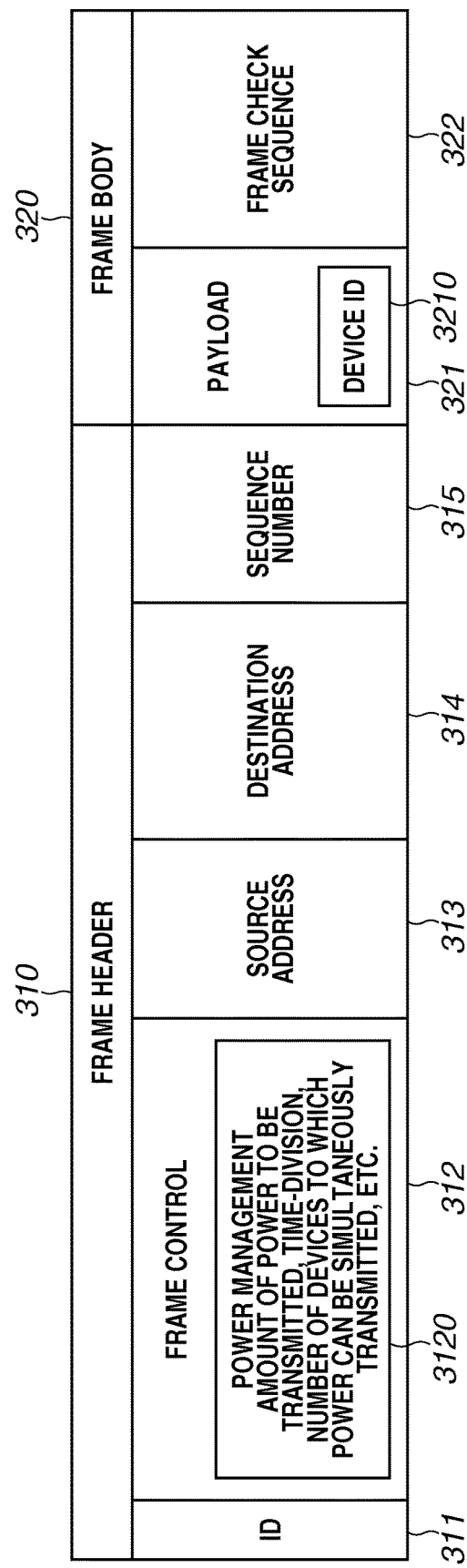
FIG. 5 illustrates an example of a frame format.

FIG. 5 illustrates an example of a frame format. In the above superframes, packets in the frame format as illustrated in FIG. 5 are used to realize data communication. Through the data communication, data necessary for starting wireless power feeding is transmitted and received.

A frame header 310 represents information such as a destination to which data is forwarded. The frame header 310 includes an ID 311, a frame control 312, a source address 313, a destination address 314, and a sequence number 315. The ID 311 is used when data communication is performed in the wireless power feeding system.

The frame control 312 represents information for performing data exchange with power reception devices 20. The frame control 312 includes a power management 3120. The power management 3120 is data representing content of the frame, such as power or data content transmitted in the payload. More specifically, the amount of power to be transmitted and capability of the power transmission device (time-division power transmission, simultaneous power transmission) are written in the power management 3120. If the power transmission device 10 can perform simultaneous power transmission, for example, the number of power reception devices 20 to which the power transmission device 10 can simultaneously transmit power is written.

The source address 313 is a source address from which data is forwarded. The destination address 314 is a destination address to which data is forwarded. Each of the source address 313 and the destination address 314 is an address for identifying an device such as a media access control (MAC) address or an Internet protocol (IP) address.

The sequence number 315 is a frame number. Data or power transmitted in a plurality of frames is managed by the sequence number 315. By using this sequence number 315, the power transmission device 10 can detect frame loss.

The frame body 320 represents information including data body to be forwarded. The frame body 320 includes a payload 321 and a frame check sequence 322. The payload 321 represents a data body. For example, information such as a device ID 3210, power information (a charging rate, a battery capacity, a power amount during power reception, etc.), a resonance frequency, and maximum power transmission time is allocated to the payload 321. The device ID 3210 is identification information about the power reception device 20. The frame check sequence 322 represents data for performing error check on the payload 321.

Figure 6:
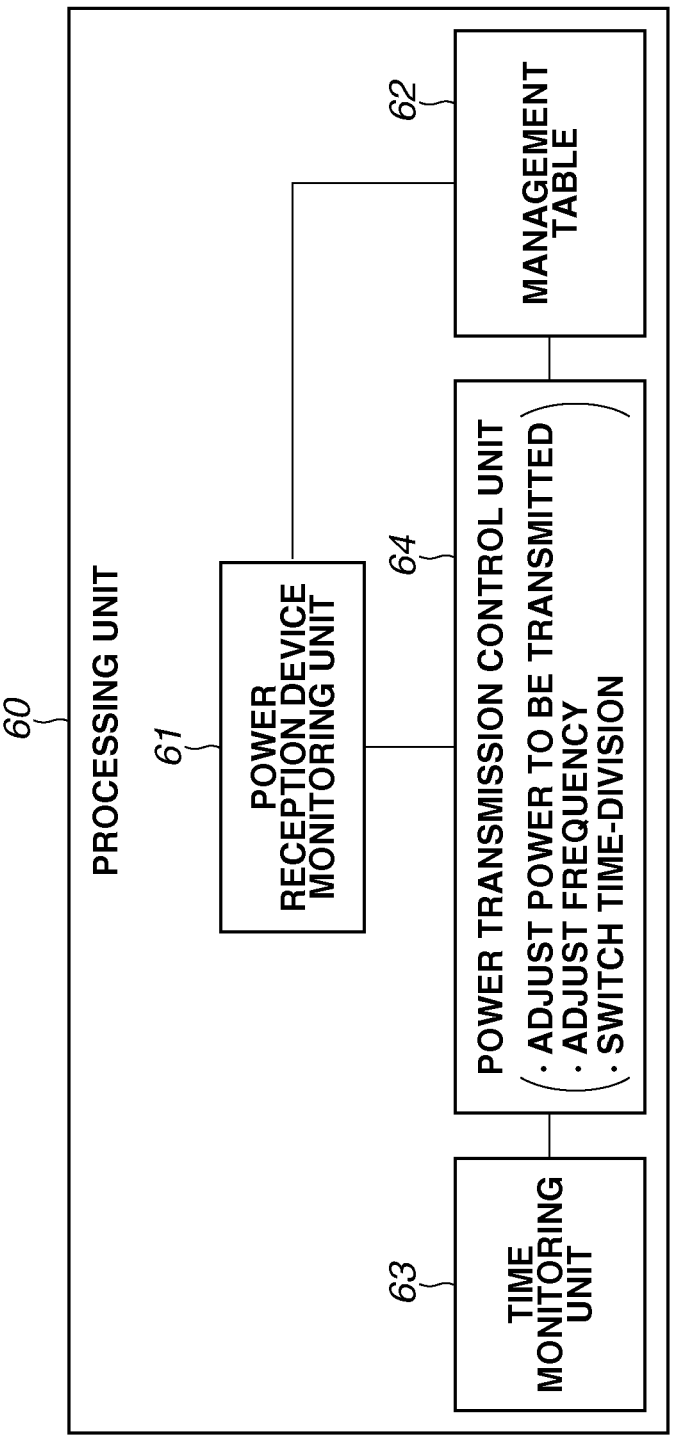
FIG. 6 illustrates a processing unit.

FIG. 6 illustrates a processing unit 60 included in the CPU 111 in the power transmission device 10. The processing unit 60 performs a process relating to power transmission. The processing unit 60 includes a power reception device monitoring unit 61, a management table 62, a time monitoring unit 63, and a power transmission control unit 64.

The power reception device monitoring unit 61 stores information such as power information and power transmission time detected in the association period (S101 in FIG. 4) and received from power reception devices 20 in the management table 62. The management table 62 stores various types of information about power reception devices 20.

The time monitoring unit 63 counts time. The power transmission control unit 64 controls power transmission in the power transmission period (S103), based on the information stored in the management table 62 and on the time counted by the time monitoring unit 63. More specifically, the power transmission control unit 64 sets transmission data in the communication circuit 121. In addition, the power transmission control unit 64 transmits power to a plurality of power reception devices 20 based on a time-division power feeding method while switching the power reception devices 20 as the power transmission targets.

FIG. 7 illustrates an example of the management table 62. The management table 62 is stored in the RAM 113. The management table 62 stores indexes, device IDs, power information, resonance frequencies, minimum time, maximum time, and power transmission time, which are associated with each other. A record includes information about a corresponding index, device ID, power information, resonance frequency, minimum time, maximum time, and power transmission time.

The management table 62 stores information received by the power transmission device 10 from the power reception devices 20. Each index represents identification information about a record. Each device ID represents a power reception device 20 that has transmitted information. When receiving a device ID in an ID transmission process (steps S211 and S213 in FIG. 8), which will be described below, the power transmission device 10 stores the device ID in the management table 62.

The power information is transmitted from the power reception devices 20. For example, the power information in a record includes the charging rate and the capacity of the battery 237 of the power reception device 20 and the current and voltage during power reception. The resonance frequency in a record represents the resonance frequency of the corresponding power reception device 20 during power reception. When receiving an answer about necessity for power (steps S231 and S233 in FIG. 8) including power information and resonance frequency information, which will be described below, the power transmission device 10 stores the power information and the resonance frequency information in the management table 62.

The minimum time and the maximum time in a record represent a minimum value and a maximum value of power transmission time, respectively, required for transmitting power from the power transmission device 10 to the corresponding power reception device 20. The power transmission time represents time required for actually transmitting power.

When the power transmission device 10 is activated, before a power reception device 20 is detected, the management table 62 is initialized. If the power transmission device 10 receives a device ID from a power reception device 20, the CPU 111 creates a new record, associates the device ID with a new index, and stores the received device ID in the management table 62. In addition, if the CPU 111 receives power information and a resonance frequency from the power reception device 20, the CPU 111 adds the received power information and resonance frequency in the new record.

In addition, the CPU 111 adds minimum time and maximum time in the new record. The minimum time is a preset value and is stored in the ROM 112, for example. The maximum time is determined by the CPU 111, based on the battery capacity included in the power information. The power transmission time is time required when the power transmission device 10 actually transmits power to the power reception device 20 and is determined by the CPU 111. A process for determining the power transmission time will be described below.

Figure 8:
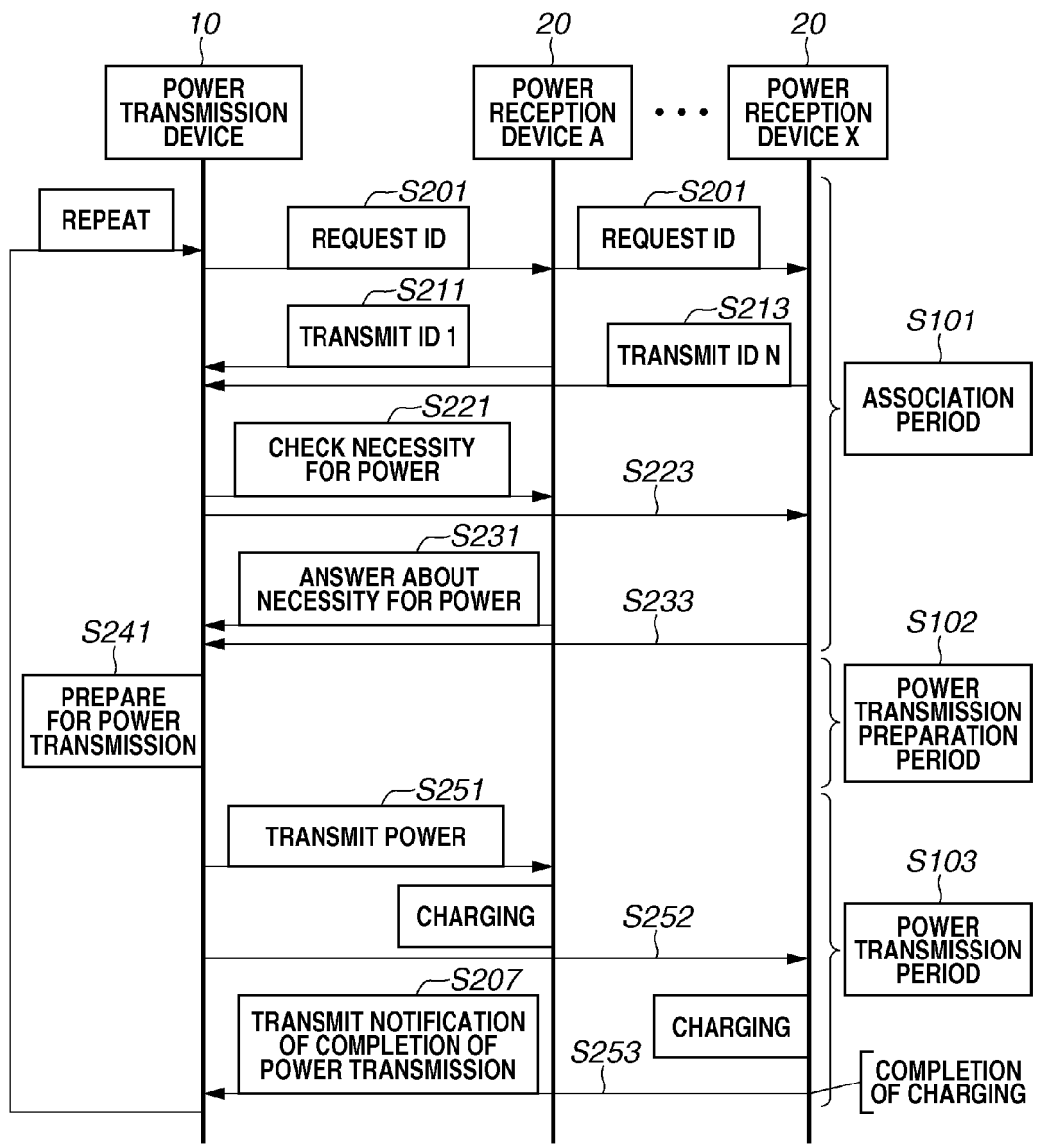
FIG. 8 is a sequence diagram illustrating a process of superframes.

FIG. 8 is a sequence diagram illustrating data exchange between the power transmission device and power reception devices by using superframes. Through data exchange as illustrated in FIG. 8 by using the above superframes (S101, S102, S103), data communication for wireless power feeding is realized.

While FIG. 8 illustrates only two power reception devices 20 (power reception devices A and X), the power transmission device 10 communicates with all the power reception devices 20 located within the communication area 40, and performs a process using superframes. Next, a process using superframes will be described based on an example in which the power reception devices A and X request power.

First, in step S201, the CPU 111 of the power transmission device 10 generates a multicast transmission frame (a device ID request) for requesting a device ID in the RAM 213. Next, the CPU 111 wirelessly transmits the device ID request to the power reception devices 20 via the communication circuit 121. When transmitting the device ID request, the CPU 111 sets a multicast ID in the ID 311 in the frame format.

Next, in steps S211 and S213, the CPU 111 of the power transmission device 10 receives a device ID 3210 from each of the power reception devices 20 (the power reception devices A and X). Each of the power reception devices 20 sets indefinite data in the ID 311 in the frame format.

Next, in steps S221 and S223, the CPU 111 of the power transmission device 10 generates a frame (check necessity for power) for checking necessity for power in the RAM 213, and wirelessly transmits the generated information about checking necessity for power to the power reception devices 20 via the communication circuit 121. Regarding this frame generated in these steps, time-division transmission as the capability of the power transmission device 10 is set in the power management 3120 in the frame format. Regarding the ID 311 in the frame format, an index allocated to each power reception device 20 in the management table 62 is set.

Next, in steps S231 and S233, the CPU 211 of each of the power reception devices 20 (the power reception devices A and X) generates a frame (an answer about necessity for power) representing necessity for power and power information (a resonance frequency and a power amount when power transmission is performed). Next, each of the power reception devices 20 wirelessly transmits the information about an answer about necessity for power to the power transmission device 10 via the wireless transmission unit 220. At that time, necessity for power and power information are set in the power management 3120 in the frame format.

Next, in step S241, the CPU 111 of the power transmission device 10 prepares for power transmission, based on the power information received in steps S231 and S233. More specifically, the CPU 111 sets information about power transmission time, a power transmission frequency used when power is transmitted, a power amount (current and voltage), and a power transmission frame of each of the power reception devices 20 (the power reception devices A and X), for example.

Next, in step S251, the CPU 111 of the power transmission device 10 generates a frame (power transmission condition) for notifying the power reception device A of the resonance frequency, the power amount, and the like used when power is transmitted. When transmitting power, the CPU 111 simultaneously transmits the power transmission condition wirelessly to the power reception device A via the power transmission circuit 122.

When receiving the power transmission condition, in response, the power reception device A is brought into a charged state, based on the resonance frequency indicated in step S231. The power reception device receives power and wireless communication data via the power reception coil 231, and the battery 237 is brought into a charging state. In addition, the CPU 211 of the power reception device A receives the wireless communication data via the reception circuit 233.

Next, in step S252, the CPU 111 of the power transmission device 10 generates a frame (power transmission condition) for notifying the power reception device X of the resonance frequency, the power amount, etc. used when power is transmitted. When transmitting power, the CPU 111 simultaneously transmits the power transmission condition wirelessly to the power reception device X via the power transmission circuit 122.

When receiving the power transmission condition, in response, the power reception device X is brought into a charging state, based on the resonance frequency indicated in step S231. The power reception device X causes the power reception coil 231 to receive power and wireless communication data, and the battery 237 is brought in a charged state. In addition, the CPU 211 of the power reception device X receives the wireless communication data via the reception circuit 233.

Next, if the CPU 211 of the power reception device X is notified by the wireless reception unit 230 of completion of charging of the battery 237, in step S253, the CPU 211 generates a frame for notifying the power transmission device 10 of completion of power transmission. Next, the CPU 211 transmits the notification of completion of power transmission to the power transmission device 10 via the communication circuit 221. In the frame for notifying completion of power transmission, "charged fully" is set in the power management 3120 in the frame format. After the power transmission period, the power transmission device 10 causes the operation to return to step S201, transmits a device ID request through multicast communication again, and detects a power reception device(s) 20.

Figure 9:
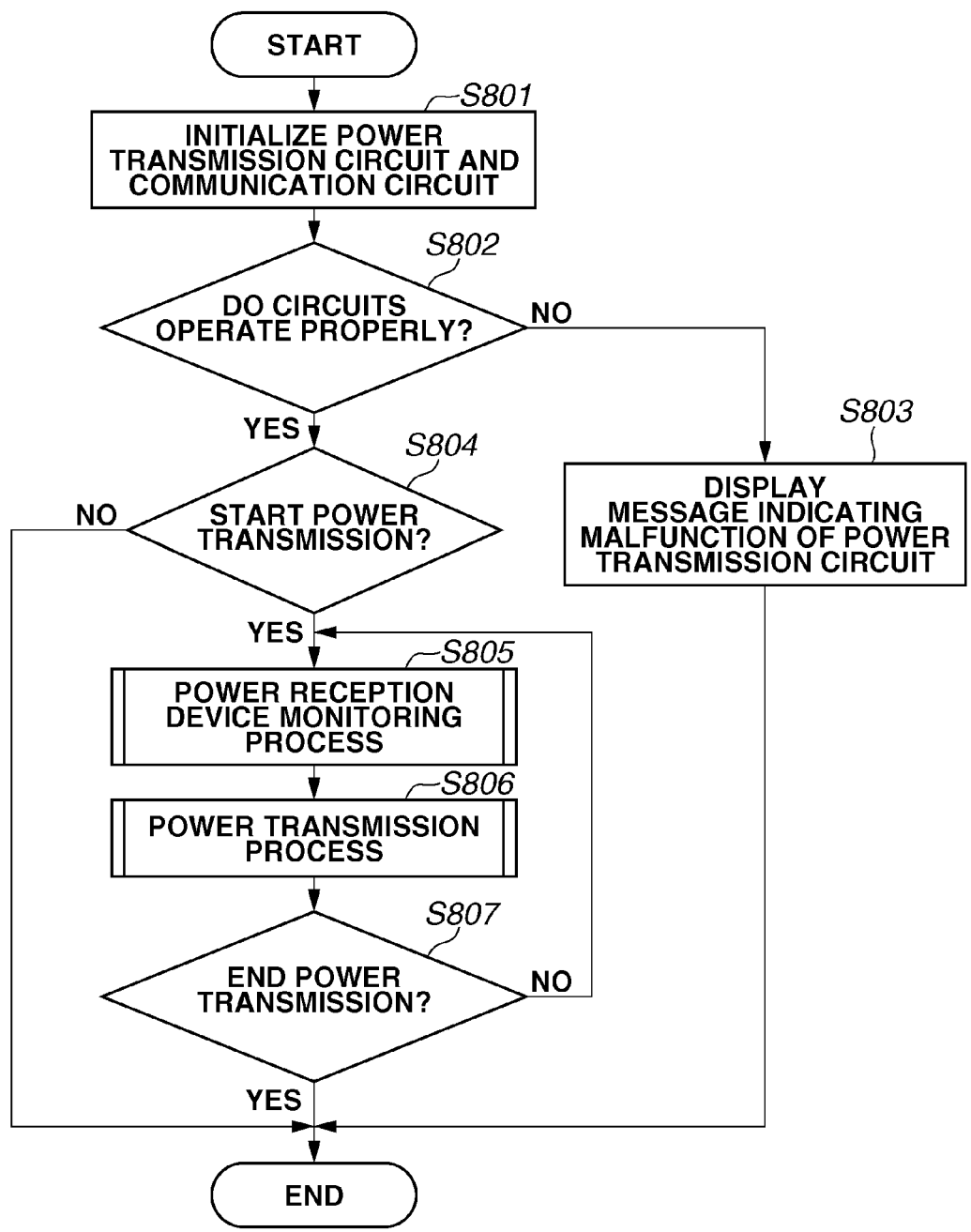
FIG. 9 is a flowchart illustrating a process performed by the power transmission device.

FIG. 9 is a flowchart illustrating a process performed by the power transmission device 10. This process illustrated in FIG. 9 is performed by the processing unit 60. First, to start superframes for power transmission, in step S801, the CPU 111 initializes the power transmission circuit 122 and the communication circuit 121. When initializing the power transmission circuit 122, the CPU 111 modulates the power input from the AC power source 140 to the resonance frequency of the power reception coil 131 stored in the ROM 112, and synthesizes the modulated signals using the diplexer 123, and transmit the synthesized signal via the power transmission coil 124. Next, the wireless reception unit 130 determines whether the power is received properly.

When initializing the communication circuit 121, as with the case of the initialization of the power transmission circuit 122, the CPU 111 transmits a test signal via the power transmission coil 124. Next, the wireless reception unit 130 determines whether the wireless signal is received properly.

Next, in step S802, the CPU 111 reads the determination results of the initialization processes of the power transmission circuit 122 and the communication circuit 121 from the wireless reception unit 130 via the internal bus 160. Next, the CPU 111 determines whether both the power transmission circuit 122 and the communication circuit 121 operate properly. If it is determined that both the power transmission circuit 122 and the communication circuit 121 operate properly (YES in step S802), the CPU 111 causes the operation to proceed to step S804. If either one of the circuits does not operate properly (NO in step S802), the CPU 111 causes the operation to proceed to step S803. In step S803, the CPU 111 displays a message or the like indicating malfunction of at least one circuit for performing power transmission control on the UI 115, and ends the power transmission control.

In step S804, the CPU 111 determines whether to start power transmission control, based on power transmission control settings stored in the ROM 112. The power transmission control settings are information representing whether to perform power transmission control. In step S804, if the CPU 111 determines to start power transmission (YES in step S804), the CPU 111 causes the operation to proceed to step S805. If not (NO step S804), the CPU 111 ends the operation.

In step S805, the CPU 111 performs a power reception device monitoring process. More specifically, the CPU 111 determines at least one power reception device as a power transmission target and stores information relating to power transmission in the management table 62. The power reception device monitoring process will be described below with reference to FIG. 10.

Next, in step S806, the CPU 111 performs a power transmission process. More specifically, the CPU 111 controls power transmission to the power reception device 20 as a power transmission target while referring to the management table 62. The power transmission process will be described below with reference to FIG. 11.

Next, in step S807, the CPU 111 determines whether to end the power transmission. More specifically, if a preset condition is satisfied, the CPU 111 determines to end the power transmission. Examples of the preset condition include when the user instructs the power transmission device 10 to end the power transmission via the UI 115, when the corresponding power transmission time stored in the ROM 112 elapses, and when the power transmission device 10 switches to a sleep mode and cannot continue power transmission control. Another example is when the power transmission device 10 receives notification of completion of power transmission from the power reception device 20.

In step S807, if the CPU 111 determines to end the power transmission (YES in step S807), the CPU 111 ends the operation. Otherwise (NO in step S807), the CPU 111 causes the operation to return to step S805. In this way, the power transmission device 10 completes the process.

Figure 10:
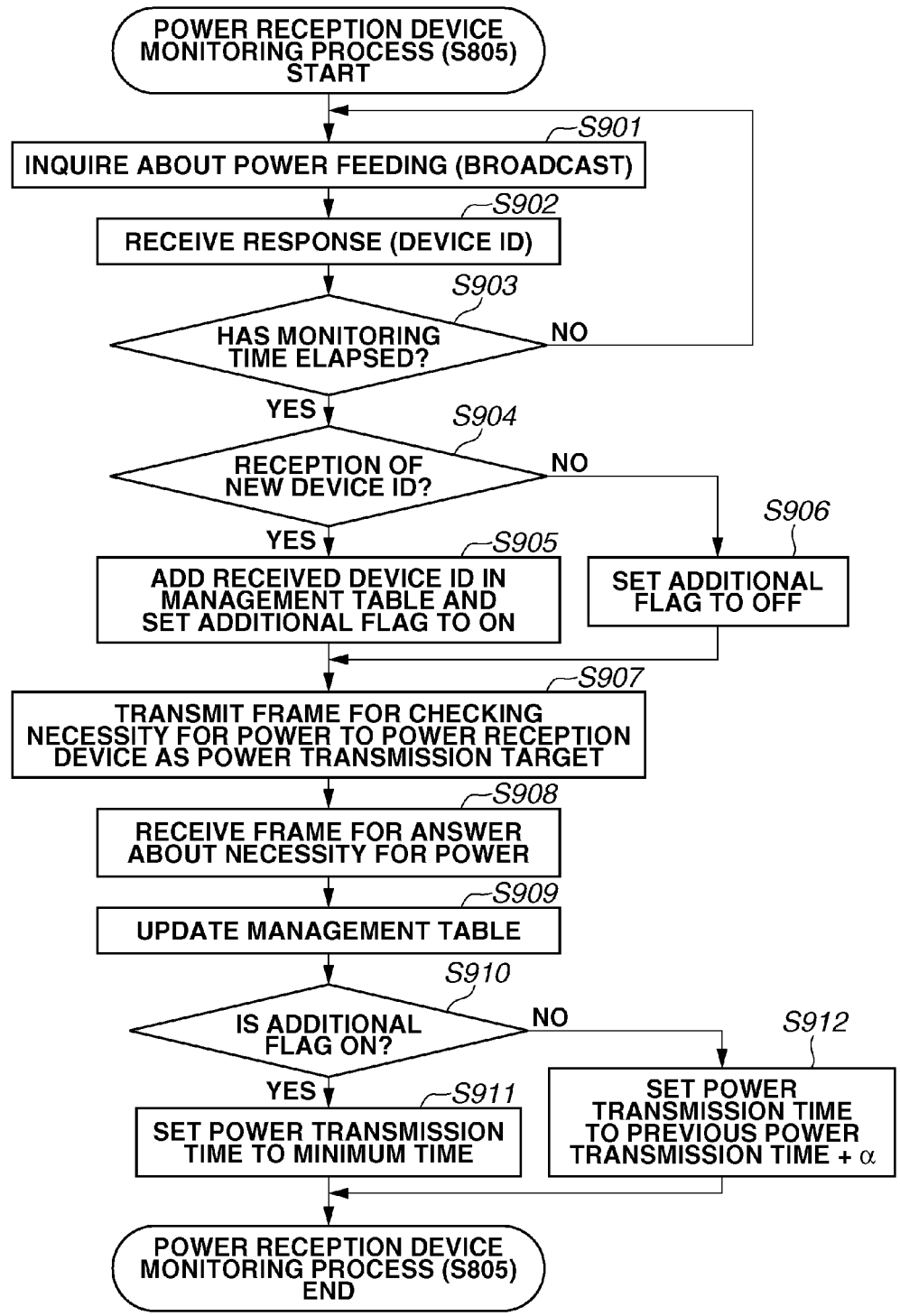
FIG. 10 is a flowchart illustrating a power reception device monitoring process.

FIG. 10 is a flowchart illustrating a detailed process of the power reception device monitoring process performed in step S805 in FIG. 9. The power reception device monitoring process is performed by the power reception device monitoring unit 61 illustrated in FIG. 6.

First, in step S901, the CPU 111 of the power transmission device 10 transmits an ID request for inquiring the power reception device 20 about power feeding through broadcast communication in step S201 in FIG. 8. Next, in step S902, the CPU 111 waits for a response to be received in response to the ID request (transmit ID in step S211) from the power reception device. Next, when receiving the response, the CPU 111 temporarily stores the device ID 3210 included in the response frame in the RAM 113.

Since the CPU 111 transmits the ID request through broadcast communication, in step S902, the CPU 111 may receive responses from a plurality of power reception devices 20. In such cases, the CPU 111 stores a received device ID 3210 included in each response, in the RAM 113. In step S902, the CPU 111 monitors the response by using a timer.

Next, in step S903, the CPU 111 determines whether preset monitoring time (response reception time) has elapsed since transmission of the broadcast ID request in step S901. Namely, the CPU 111 determines whether the time runs out. In the present exemplary embodiment, the monitoring time is stored in advance in the ROM 112 or the like. The monitoring time may be set as a fixed value, or may be set and varied by the user.

In step S903, if the monitoring time has elapsed (YES in step S903), the CPU 111 causes the operation to proceed to step S904. If not (NO in step S903), the CPU 111 causes the operation to return to step S901.

In step S904, the CPU 111 refers to the management table 62 to compare the device ID received in step S902 and temporarily stored in the RAM 113 with the device IDs stored in the management table 62.

The CPU 111 determines whether a device ID that is not stored in the management table 62 is temporarily stored in the RAM 113. In other words, the CPU 111 determines whether the CPU 111 has received a new device ID.

In step S904, if the CPU 111 determines reception of a new device ID (YES in step S904), the CPU 111 causes the operation to proceed to step S905. In step S905, the CPU 111 creates a new record in the management table 62 and adds the new device ID to the new record. Next, the CPU 111 sets an additional flag to ON. In the present exemplary embodiment, this additional flag is stored in the RAM 113 or the like.

On the other hand, in step S904, if the CPU 111 does not determine reception of a new device ID (NO in step S904), the CPU 111 causes the operation to proceed to step S906. In step S906, the CPU 111 sets the additional flag to OFF.

Next, steps S905 and S906 will be described. There are cases in which, in a superframe that has already been executed prior to the superframe being executed currently (a superframe executed in the past), power has already been transmitted to a power reception device 20 determined as a power transmission target in the superframe being executed. In such a case, in the superframe that has already been executed, the device ID of the power reception device 20 to which power has already been transmitted has already been stored in the management table 62 in step S905 of the superframe that already been executed.

Therefore, by comparing the device ID temporarily stored in the RAM 113 with the device IDs stored in the management table 62, the CPU 111 can determine whether the received device ID is a new device ID.

In addition, the additional flag is information representing whether a new power reception device 20 to which power has not been transmitted in the superframe that has already been executed has been added as a power transmission target in the superframe being executed. The new power reception device 20 is a power reception device 20 that is identified by a new device ID and to which power was not transmitted in the past.

Next, in step S907, the CPU 111 determines the power reception device 20 identified by a device ID stored in the management table 62 as a power transmission target (power transmission target determination process). In other words, the CPU 111 determines the power reception device 20 whose answer about necessity for power transmitted, as a power transmission target. Next, the CPU 111 transmits a frame for checking necessity for power to the power reception device as a power transmission target in steps S221 and S223 in FIG. 8.

Next, in step S908, the CPU 111 receives a frame for an answer about necessity for power from the power reception device 20 to which the frame for checking necessity for power has been transmitted in steps S231 and S233 in FIG. 8. Next, in step S909, the CPU 111 associates the power information and the resonance frequency included in the frame for an answer about necessity for power with the device ID of the transmission source power reception device 20 and stores the associated information in the management table 62. In addition, the CPU 111 associates minimum time and maximum time with the device ID of the transmission source power reception device 20, and stores the associated information in the management table 62.

Next, in step S910, the CPU 111 checks the value of the additional flag. In step S910, if the additional flag is ON (YES in step S910), the CPU 111 causes the operation to proceed to step S911. If not (NO in step S910), the CPU 111 causes the operation to proceed to step S912. In step S911, the CPU 111 refers to the management table 62, determines the minimum time of each power reception device 20 as power transmission time (power transmission time determination process), and updates the management table 62. There are cases in which a new power reception device 20 and a power reception device 20 to which power has already been transmitted are included as power transmission targets. In such a case, in step S911, the CPU 111 determines time equal to the transmission time used for previous power transmission to the power reception device 20 to which power was transmitted in the past (minimum time) as the power transmission time.

In the present exemplary embodiment, the CPU 111 determines the minimum time as the power transmission time for such a power reception device 20 to which power was transmitted in the past. The present embodiment is also applicable, as long as the time is shorter than the power transmission time used for previous power transmission to the power reception device 20 to which power has already been transmitted in the past. For example, the CPU 111 may determine time a certain period shorter than previous power transmission time (time longer than the minimum time) as the power transmission time.

In step S912, the CPU 111 determines time longer than the power transmission time used in previous power transmission in a superframe that has already been executed as the power transmission time (power transmission time determination process), and updates the management table 62. More specifically, the CPU 111 refers to the management table 62 and sets a value obtained by adding additional time (α) to the power transmission time that has already been set in a superframe that had already been executed, as new power transmission time. The additional time is shorter than the maximum time and is set in advance. In the present exemplary embodiment, the additional time is stored in the ROM 112 or the like. By performing step S912, the CPU 111 can gradually extend power transmission time for one time with respect to power reception devices 20 continuously determined as power transmission targets.

Alternatively, in step S912, the CPU 111 may compare the power transmission time to which the additional time has been added with the maximum time. In such a case, if the value obtained after the addition is equal to the maximum time or more, the CPU 111 determines the maximum time as the power transmission time, instead of the value obtained after the addition. If the value obtained after the addition is shorter than the maximum time, the CPU 111 determines the value obtained after the addition as the power transmission time.

Figure 11:
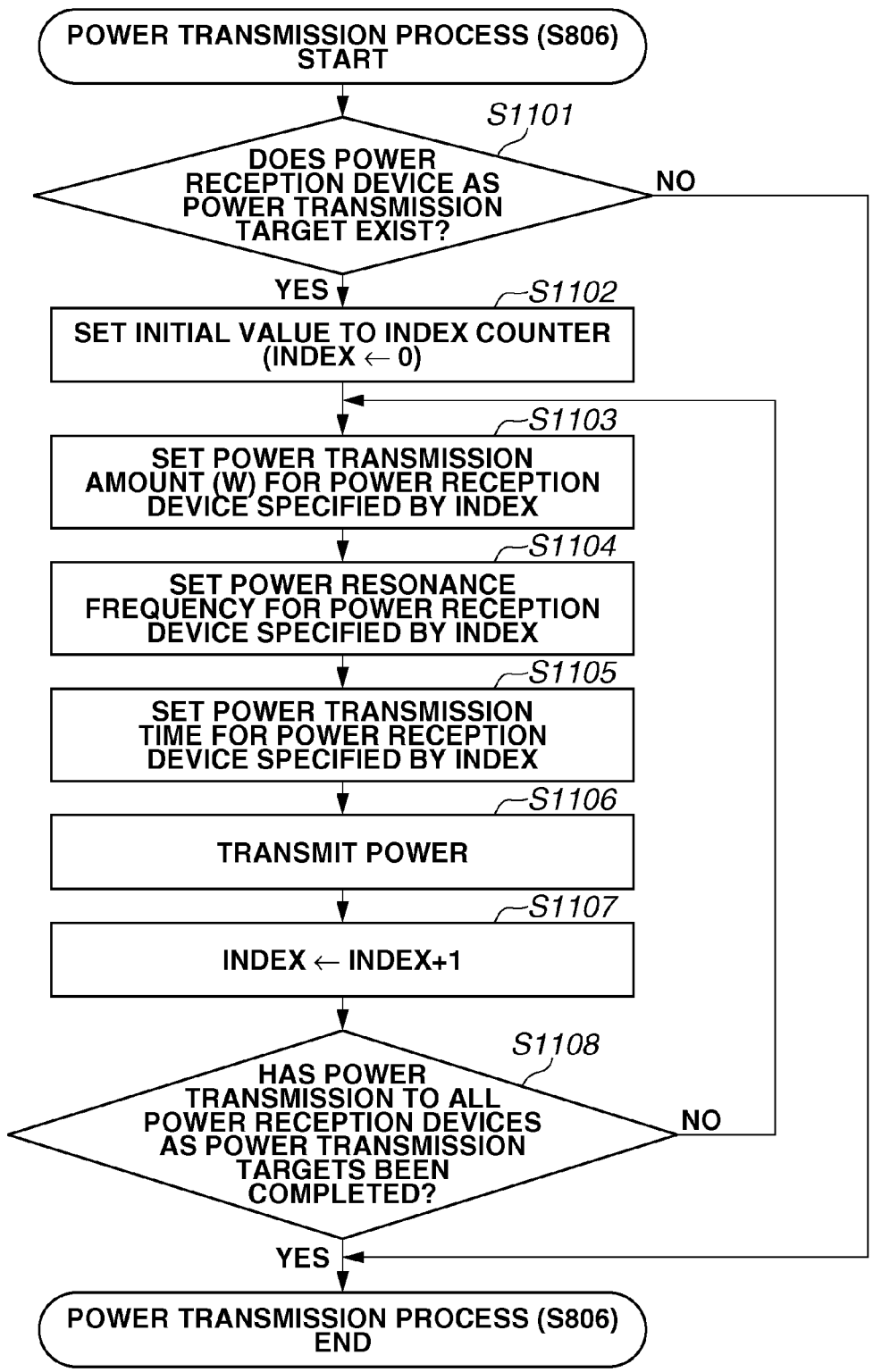
FIG. 11 is a flowchart illustrating a power transmission process.

FIG. 11 is a flowchart illustrating a detailed process of the power transmission process in step S806 in FIG. 9. The power transmission process is performed by the power transmission control unit 64 illustrated in FIG. 6. First, in step S1101, the CPU 111 determines whether a power reception device 20 as a power transmission target exists. More specifically, the CPU 111 determines whether the management table 62 includes a record thereof.

In step S1101, if a power reception device 20 as a power transmission target exists (YES in step S1101), the CPU 111 causes the operation to proceed to step S1102. If not (NO in step S1101), the CPU 111 ends the power transmission process.

In step S1102, the CPU 111 sets an index counter for referring to the management table 62 to 0. Next, in step S1103, the CPU 111 specifies a record corresponding to the index counter in the management table 62, and extracts power information included in the specified record. Next, the CPU 111 sets the power transmission amount (current and voltage) used when power is transmitted to the corresponding power reception device 20 in the power transmission circuit 122. Thus, the CPU 111 sets the power transmission amount used when power is transmitted to the power reception device 20 corresponding to the record specified by the index counter, i.e., to the power reception device 20 to which power is about to be transmitted.

Next, in step S1104, the CPU 111 extracts the resonance frequency included in the specified record and sets the resonance frequency in the power transmission circuit 122. Next, in step S1105, the CPU 111 sets the power transmission time included in the specified record to the power transmission circuit 122.

Next, in step S1106, the CPU 111 supplies the power transmission amount set in the power transmission coil 124 from the AC power source 140 via the power transmission circuit 122, modulates the power transmission amount into the resonance frequency set as a power signal, and transmits the power transmission amount (power transmission process). In addition, the CPU 111 outputs transmission data of a power transmission frame transmitted from the communication circuit 121. The power signal and the transmission data are synthesized by the diplexer 123, and the synthesized signal is transmitted from the power transmission coil 124. The power is transmitted for the power transmission time.

The power reception device 20 separates the received signal into the power signal and the transmission data at the diplexer 232 from the reception coil 231. Next, the power reception device 20 performs power reception settings based on the transmission data and charges the battery 237 with the power signal via the rectification circuit 235 and the voltage stabilization circuit 236.

Next, in step S1107, the CPU 111 adds 1 to the value of the index counter. Next, in step S1108, the CPU 111 confirms whether another record corresponding to an index counter value exists in the management table 62. In other words, the CPU 111 confirms whether a power reception device 20 to which power has not been transmitted exists among the power reception devices 20 as the power transmission targets.

In step S1108, if power transmission to all the power reception devices 20 as the power transmission targets has been completed (YES in step S1108), the CPU 111 ends the power transmission process. In step S1108, if a power reception device 20 as a power transmission target to which power has not been transmitted exists (NO in step S1108), the CPU 111 causes the operation to return to step S1103. In this way, the power transmission device 10 completes the power transmission process.

Figure 12:
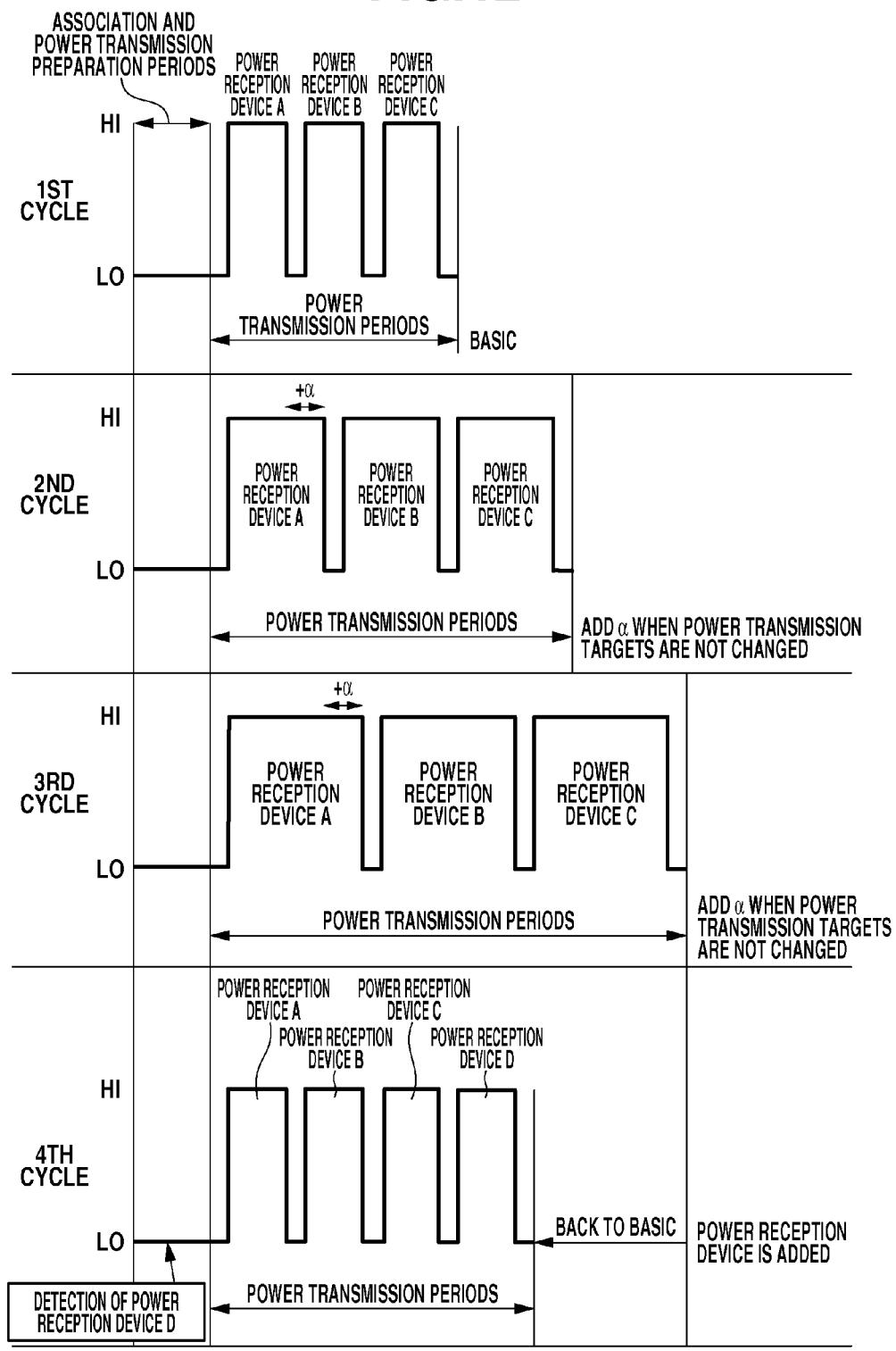
FIG. 12 illustrates an example of transmission time.

FIG. 12 illustrates power transmission time for each power reception device 20 based on a plurality of superframes consecutively executed. The transmission time illustrated in FIG. 12 is determined in the power reception device monitoring process in FIG. 10. In FIG. 12, horizontal axes represent time and vertical axes represent power transmission (HI) and data communication (LO).

If power reception devices A to C are determined as the power transmission targets in the superframe in the first cycle, the CPU 111 of the power transmission device sets minimum time as the power transmission time for each of the power reception devices A to C in step S911 in FIG. 10.

As with the case of the superframe in the first cycle, if the power reception devices A to C are determined as the power transmission targets in the superframe in the next second cycle, the CPU 111 sets a value obtained by adding the additional time (α) to the power transmission time set in the superframe in the first cycle as the power transmission time of each of the power reception devices A to C in step S912.

Next, as with the case of the superframe in the second cycle, if the power reception devices A to C are determined as the power transmission targets in the superframe in the third cycle, the CPU 111 sets a value obtained by adding the additional time (α) to the power transmission time set in the superframe in the second cycle as the power transmission time for each of the power reception devices A to C in step S912. In this way, the power transmission time for each of the power reception devices A to C in the third cycle is set to be longer than that of corresponding one of the power reception devices A to C in the second cycle. In addition, the power transmission period in the third cycle is set to be longer than that in the second cycle.

If a new power reception device D is added to the power transmission targets in the superframe in the fourth cycle, the CPU 111 sets the minimum time as the power transmission time for each of the power reception devices A to D in step S911. In this way, the power transmission period in the fourth cycle is set to be the same as that in the first cycle.

Thus, in the wireless power feeding system according to the present exemplary embodiment, if the power transmission targets in the previous superframe match those in the currently-executed superframe, the power transmission time is extended. In this way, the power transmission efficiency can be improved.

In addition, since the power transmission time is extended, the battery 237 of each power reception device 20 can be less switched between charging and non-charging states. Thus, since load on the battery of each power reception device 20 can be reduced, life of the battery 237 can be improved.

In addition, since the power transmission device 10 can extend the power transmission time to the maximum time, the transmission efficiency can gradually be improved. As described above, the power transmission device 10 can achieve improvement in transmission efficiency while starting power transmission to power reception devices at appropriate timing.

Next, a wireless power feeding system according to a second exemplary embodiment will be described. In the wireless power feeding system according to the second exemplary embodiment, if a new power reception device 20 is added as a power transmission target, the power transmission device 10 sets the maximum time as the power transmission time, instead of adding the additional time to the power transmission time. Hereinafter, a process different from the wireless power feeding system according to the first exemplary embodiment will be described.

Figure 13:
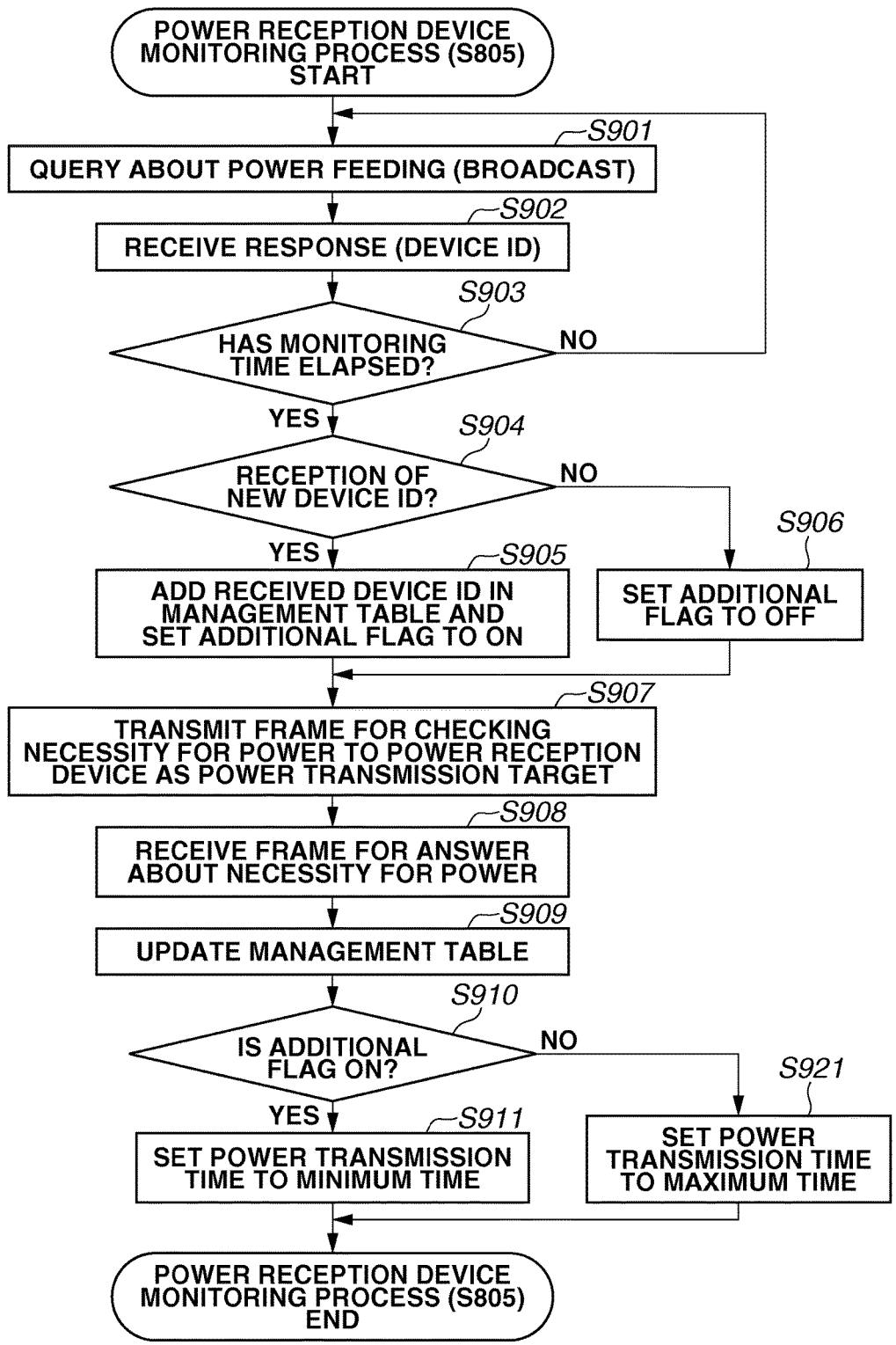
FIG. 13 is a flowchart illustrating a power reception device monitoring process.

FIG. 13 is a flowchart illustrating a power reception device monitoring process in step S805 performed by the power transmission device 10 according to the second exemplary embodiment. The same steps as those in the power reception device monitoring process illustrated in FIG. 10 according to the first exemplary embodiment are denoted by the same reference symbols. In step S910, if the additional flag is OFF (NO in step S910), the CPU 111 causes the operation to proceed to step S921. In step S921, the CPU 111 refers to the management table 62 and sets the power transmission time to the maximum time.

Other configurations and processes in the wireless power feeding system according to the second exemplary embodiment are the same as those in the wireless power feeding system according to the first exemplary embodiment.

Figure 14:
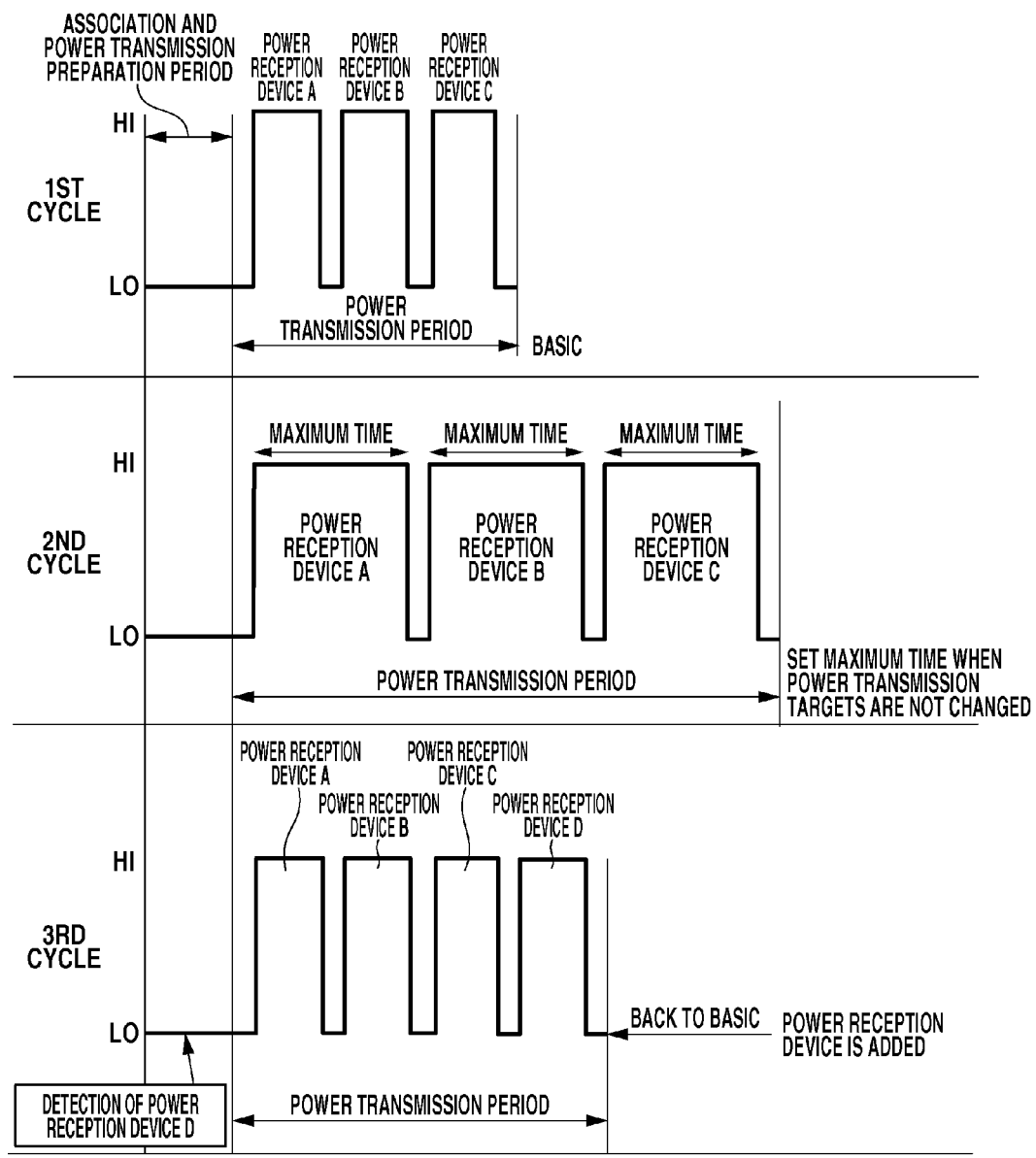
FIG. 14 illustrates an example of transmission time.

FIG. 14 illustrates power transmission time for each power reception device 20 based on a plurality of superframes consecutively executed in the wireless power feeding system according to the second exemplary embodiment. The transmission time illustrated in FIG. 14 is determined in the power reception device monitoring process illustrated in FIG. 13. If the power reception devices A to C are determined as the power transmission targets in the superframe in the first cycle, the CPU 111 of the power transmission device 10 sets the minimum time as the power transmission time for each of the power reception devices A to C in step S911 in FIG. 13.

As with the case of the superframe in the first cycle, if the power reception devices A to C are determined as the power transmission targets in the superframe in the next second cycle, the CPU 111 sets the maximum time as the power transmission time of each of the power reception devices A to C in step S921.

Next, if a new power reception device D is added to the power transmission targets in the superframe in the third cycle, the CPU 111 sets the minimum time as the power transmission time of each of the power reception devices A to D in step S911. In this way, the power transmission period in the third cycle is set to be the same as that in the first cycle.

Thus, in the wireless power feeding system according to the second exemplary embodiment, if the power transmission targets in the previous superframe match those in the currently-executed superframe, the maximum time is set as the power transmission time. In this way, the power transmission time can be changed to be longer within a time period shorter than that according to the first exemplary embodiment. In this way, the transmission efficiency can be further improved.

Next, a wireless power feeding system according to a third exemplary embodiment will be described. In the wireless power feeding system according to the third exemplary embodiment, the power transmission time is determined by a different process depending on the time slot in which the process is executed.

FIG. 15 is a flowchart illustrating a process performed by the power transmission device 10 according to the third exemplary embodiment. The same steps as those according to the first exemplary embodiment in FIG. 9 are denoted by the same reference symbols.

In step S804, if the CPU 111 determines to start power transmission (YES in step S804), the CPU 111 causes the operation to proceeds to step S821. In step S821, the CPU 111 acquires time data representing when the process is executed from the RTC 116. The time indicated by the time data representing when the process is executed is an example of time when power is transmitted. Next, in step S822, the CPU 111 determines whether the time indicated by the time data is included in either a first or second time slot. In the present exemplary embodiment, the first and second time slots are set in advance in the ROM 112 or the like.

In step S822, if the time is included in the first time slot (YES in step S822), the CPU 111 causes the operation to proceed to step S821. If not (NO in step S822), the CPU 111 causes the operation to proceed to step S822.

In step S821, the CPU 111 performs a first power reception device monitoring process. In step S822, the CPU 111 performs a second power reception device monitoring process. The first power reception device monitoring process is similar to the power reception device monitoring process illustrated in FIG. 10. The second power reception device monitoring process is similar to the power reception device monitoring process illustrated in FIG. 13. Step S822 is an example of a process setting processing.

Other configurations and processes in the wireless power feeding system according to the third exemplary embodiment are similar to those in the wireless power feeding system according to the other exemplary embodiments.

The power transmission device 10 according to the third exemplary embodiment can switch the power reception device monitoring processes, according to the time slot in which the process is executed.

For example, by the power transmission device 10 performing the second power reception device monitoring process and by setting the power transmission time to the maximum time when the power reception devices 20 as the power transmission targets are changed less frequently such as at night, the transmission efficiency can be improved. On the other hand, when the power reception devices 20 as the power transmission targets are changed more frequently such as during the day, the power transmission device 10 can perform the first power reception device monitoring process.

Thus, according to any one of the above exemplary embodiments, transmission efficiency can be improved while starting power transmission to power reception devices at appropriate timing.

Other Embodiments

Additional embodiments can also be realized by a computer of a system or device that reads out and executes computer executable instructions recorded on a storage medium (e.g., computer-readable storage medium) to perform the functions of one or more of the above-described embodiment(s), and by a method performed by the computer of the system or device by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-102441 filed May 14, 2013, which is hereby incorporated by reference herein in its entirety.

What is claimed is:

1. A power transmission device comprising:
   a power transmission unit configured to transmit power to a plurality of power reception devices in a time-division manner, wherein a transmission time allocated to a particular power reception device among the plurality of power reception devices is a first time; and
   a changing unit configured to change the transmission time allocated to the particular power reception device to a second time that is shorter than the first time in a case of detection, by the power transmission device, of emergence of a new power reception device that is not included in the plurality of power reception devices constituting targets of power transmission.

2. A power transmission method of a power transmission device, the power transmission method comprising:
   transmitting power to a plurality of power reception devices in a time-division manner, wherein a transmission time allocated to a particular power reception device among the plurality of power reception devices is a first time; and
   changing the transmission time allocated to the particular power reception device to a second time that is shorter than the first time in a case of detection, by the power transmission device, of emergence of a new power reception device that is not included in the plurality of power reception devices constituting targets of power transmission.

3. A non-transitory computer-readable storage medium storing computer executable instructions for causing a power transmission device to execute a method, the method comprising:
- transmitting power to a plurality of power reception devices in a time-division manner, wherein a transmission time allocated to a particular power reception device among the plurality of power reception devices is a first time; and
- changing the transmission time allocated to the particular power reception device to a second time that is shorter than the first time in a case of detection, by the power transmission device, of emergence of a new power reception device that is not included in the plurality of power reception devices constituting targets of power transmission.

4. The power transmission device according to claim 1,
- wherein the power transmission device determines at a predetermined timing whether the new power reception device has emerged or not; and
- wherein, in a case where it is determined by the power transmission device that the new power reception device has emerged, the changing unit changes the transmission time allocated to the particular power reception device to the second time.

5. The power transmission device according to claim 4,
- wherein, in a case where it is determined by the power transmission device that the new power reception device has not emerged, the changing unit changes the transmission time allocated to the particular power reception device to a third time that is longer than the first time.

* * * * *